Feb. 27, 1934.   F. T. MEYER   1,948,970
WATER CLOSET BOWL
Filed Oct. 30, 1931   2 Sheets-Sheet 2
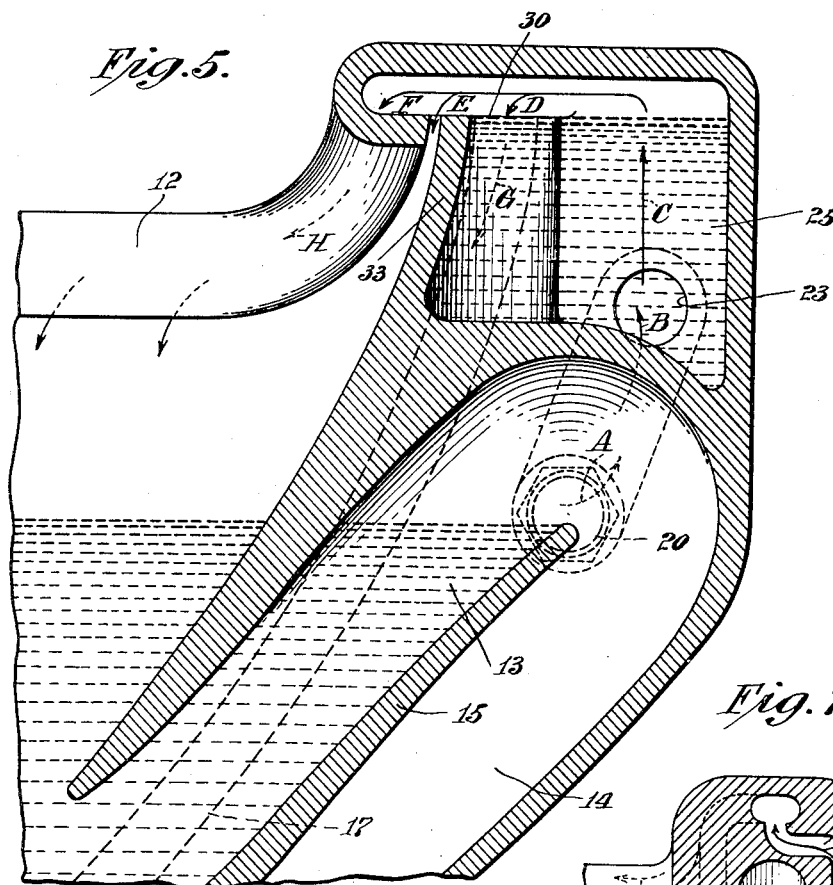
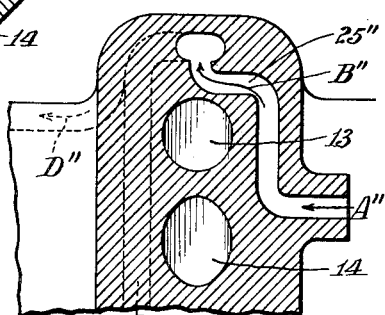
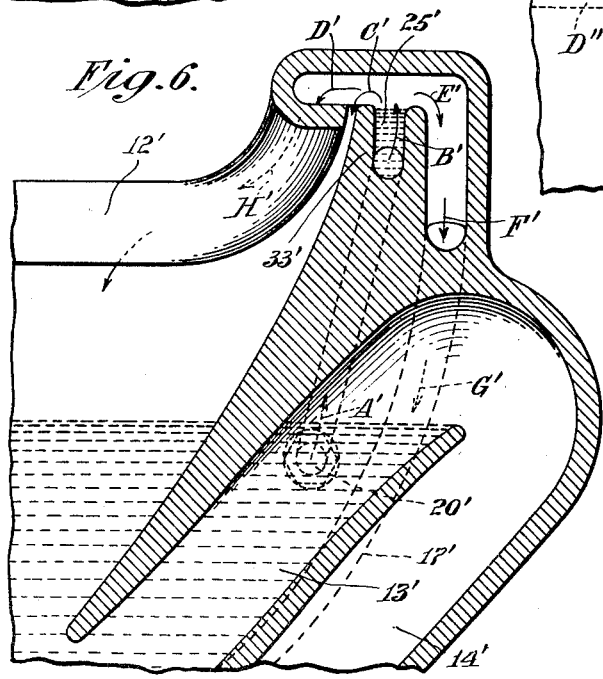
INVENTOR
Francis T. Meyer
BY Philipp Sawyer Rice
Kennedy
ATTORNEYS Patented Feb. 27, 1934

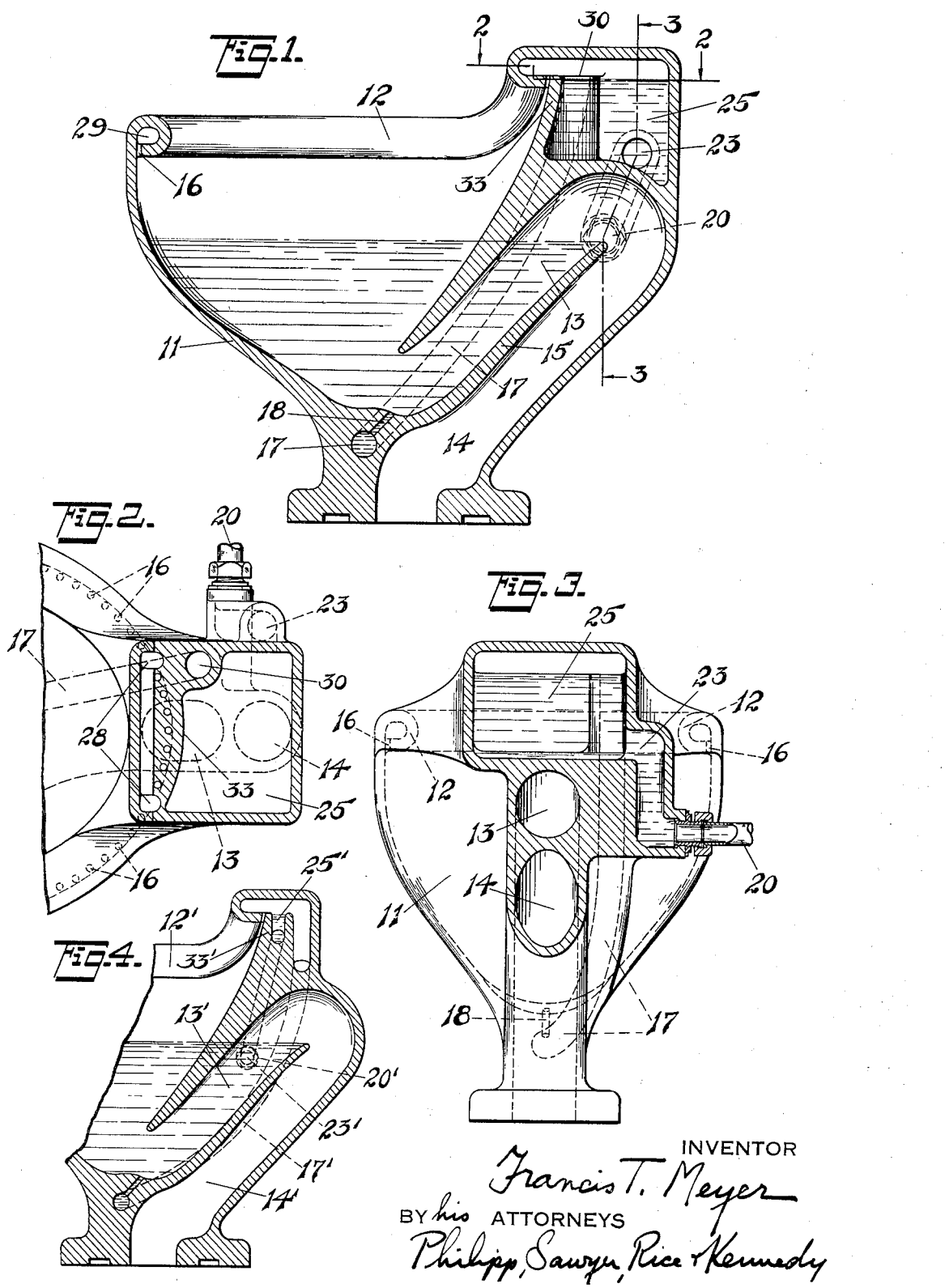

1,948,970

UNITED STATES PATENT OFFICE 1,948,970

WATER CLOSET BOWL

Francis T. Meyer, Montclair, N. J., assignor to
The Meyer-Sniffen Company, New York, N. Y.,
a corporation of New York Application October 30, 1931. Serial No. 571,974

7 Claims. (Cl. 4—69)

This invention relates to water closet bowls and the water supply or tanks associated therewith.

The principal object of the invention is to provide a bowl having a jet or a flushing rim or both, and a flushing water supply means for the bowl so constructed and arranged that back-siphoning, or flow from the bowl into the water supply line cannot occur.

Such back flow has occurred in some instances, either by a rise of water level in the bowl or by a loss of pressure in the water supply line or by both, thus constituting a source of pollution of the water supply and, consequently, constituting a menace to the health of the individual and the community. Accordingly it is, more specifically, an object of the invention to provide a construction which may include either a flushing rim or a jet or both and in which such back flow cannot occur regardless of the water level in the bowl and regardless of decrease of pressure in the water supply line or even the occurrence of minus pressure therein resulting in a back flow of the water that is in the supply line.

The invention, therefore, comprises control means between the bowl interior and the water supply line so constructed and arranged that regardless of the location of any jet outlets, with which the bowl may be provided, and regardless of the height to which the bowl water level may rise within the bowl, whether the rim is a flushing rim or not, the back flow above described cannot occur.

Other objects and advantages of the invention, not hereinabove specifically referred to, will appear from the following description, taken in connection with the accompanying drawings, which illustrate, by way of example, a simple and preferred form of the invention, but which are not to be taken as a definition of the limits of the invention, reference for that purpose being had to the appended claims.

In the drawings:

Figure 1 is a central vertical sectional view showing a bowl, water supply and control means constructed in accordance with the present invention;

Figure 2 is a fragmentary horizontal sectional view thereof taken on line 2—2 of Figure 1;

Figure 3 is a vertical sectional view taken on the line 3—3 of Figure 1;

Figure 4 is a view similar to Figure 1, but fragmentary, and showing a different arrangement of water supply;

Figures 5 and 6 are enlarged sectional views showing more clearly how the construction prevents back-siphoning; and Figure 7 is a somewhat distorted sectional view the purpose of which is to illustrate how water flows from the reservoir during flushing action and how back-siphoning is at all times prevented.

Referring in detail to the drawings, a bowl 11 is provided with a flushing rim 12 having flushing outlets 16 and the siphon outlet passages 13 and 14 separated by a wall 15. Cooperating with the outlet passage 13 may be a water supply conduit 17 arranged in the lower bowl wall and having a jet outlet 18 whose general direction is substantially the same as that of the passage 13.

The bowl is provided with a water supply line 20 or 20', the supply line 20, as illustrated in Figures 1, 2 and 3, approaching the bowl horizontally and below the rim 12, and may even, as shown in Figure 1, be below the bowl water level at the top of the wall 15, this for convenience in locating and operating the flushing valve (not shown). Where the supply line is so arranged, as it preferably is in accordance with the invention, the bowl is provided with an auxiliary supply conduit 23, leading, in one example upwardly to a reservoir 25, which is preferably arranged at the rear of the bowl, and at the top thereof over the siphon outlet passage, as shown in Figure 1. The reservoir 25 is provided with a plurality of outlets leading into the bowl proper. In the example illustrated, these outlets include the rim passage openings 28 leading to the interior 29 of the flushing rim 12, and the opening 30 for the jet conduit 17.

In accordance with the present invention, the front wall 33 of the reservoir 25 extends upwardly from the bottom of the reservoir to a point definitely higher than the general level of the rim 12, this front wall extending across the reservoir and separating the reservoir from the reservoir outlets 28 and 30. The result of the construction described is that the flushing water supplied to the jet conduit 17 must enter that conduit at a point therein higher than the general level of the rim 12, and the flushing water supplied to the rim 12 must enter that rim at a point higher than the general level of the rim.

Consequently, upon a rise of water level within the bowl no siphon connection will ever be established from within the bowl proper to the supply line since, before a rise can occur to a point high enough for the water in the bowl proper to flow back into the reservoir, either through the jet conduit 17 or the rim supply conduit 20, the water in the bowl proper will reach a level higher than the general level of the rim 12, whereupon it will overflow said rim. Therefore, no back flow into the reservoir 25 or into the supply line can occur either by reason of a rise of water level in the bowl or by reason of a reduction of pressure in the water supply line or even a minus pressure therein with respect to the atmospheric pressure on the water in the bowl proper.

In Figure 4, the water supply inlet to the bowl is relatively low and may be not only lower than the general rim level but may also be lower than the general water level in the bowl. In this construction, the water supply rises through the dotted line conduit which is normally filled with water up to the top 25' of the conduit, a forward dam 33' being located on one side of the conduit to provide a flow-over edge for the water supplied to the rim, this flow-over edge being higher than the general rim level and the water supply conduit being open to the atmosphere at a level above the general rim level, there being a similar dam, wall or flow-over edge at the other side of the conduit for water to be delivered through the siphon jet conduit 17' to the siphon jet.

In Figure 5, arrow A indicates the flow of water into the fixture through the inlet opening thereof and traveling upwardly through the inlet passage. Arrow B indicates the flow of water from the inlet passage into the water reservoir of the fixture, in which reservoir this water is normally maintained at the level indicated by the point of arrow C. During flushing action due to the inrush of a fresh supply of water in the direction of arrow A, water in the reservoir overflows and travels in the directions indicated by arrows D, E and F. Arrow D indicates the flow of water from the reservoir over one of its walls and down passage 30 to the flushing jet opening 18. Arrow E indicates the downward direction of flow at the rear portion of the flushing rim. Arrows F and H indicate the flow of water around the flushing rim to the flushing rim openings 16. Overflow in the direction of arrows D, E and F continues until the inflow of water at arrow A ceases, whereupon the water in the reservoir drops to and remains at the level of the point of arrow C, any surplus going off in the direction of arrows D, E and F through the openings indicated by them.

Referring to Figure 6, substantially the same action occurs, water coming into the fixture at A' flowing upwardly under pipe line pressure and entering the reservoir as indicated by arrow B', normally remaining at the level indicated by the point of arrow B', and upon flushing overflowing in the direction of arrows C', D' and E'. Water flowing in the direction of arrow E' travels downwardly through the jet passage in the direction indicated by arows F' and G', and water flowing in the direction of arrow C' enters the bowl immediately at the rear thereof, while water flowing in the direction of arrow D' travels around the flushing rim, as indicated by arrow H', to the flushing rim openings 16.

Referring to Figure 7, the outlet passages 13 and 14 are shown as before, as for example in Figure 3. Incoming water rises in the reservoir in the direction of arrows A" and B" until it reaches the level indicated by the point of arrow B". Any overflow causes the overflow water to travel through the downward dotted-line flushing jet passage in the direction of arrow C" and also in the direction of arrow D" around the flushing rim to the flushing rim openings 16.

It will be noted that in each illustrated embodiment of the invention the construction provides a reservoir open to atmospheric pressure, for example, through the flushing rim, and containing supply water normally maintained by the reservoir walls at a level higher than the lowest level of the bowl rim. With this construction, bowl water can never back-siphon into the supply line for the reason that before rising as high as would be necessary to enter the reservoir the bowl water would overflow the bowl rim.

It is obvious that more than one jet and more than one jet conduit may be provided and it is also obvious that the rim supply inlet 28 and the jet supply inlet 30 may be varied widely in position and arrangement without departing from the invention as defined by the following claims.

It will also be obvious and will be understood that the size and shape of the reservoir to contain the supply water may likewise be varied within the scope of the claims, the essential feature being that there be a container normally maintaining water at a higher level than the bowl rim.

What is claimed is:

1. A water closet bowl having a rim, an outlet passage and a jet conduit associated with the latter, and a water supply line for said bowl and said jet conduit entering said bowl below the general level of said rim and including a flow-over edge and having a water supply inlet on one side thereof and communicating with both the interior of said bowl and with said jet conduit on the other side thereof, at least a portion of said rim being at a lower level than said flow-over edge.

2. A water closet bowl having a rim, an outlet passage and a water supply line for the interior of said bowl entering said bowl below the general level of said rim and including an inlet and a reservoir providing a dam, said reservoir communicating on one side of said dam with said inlet and communicating over said dam and only over said dam with the interior of said bowl, at least a portion of said rim being at a lower level than said dam.

3. A water closet bowl having an outlet passage and a flushing rim providing a conduit communicating with the interior of the bowl, and a water supply line for said conduit entering said bowl below the general level of said rim and including a flow-over edge and having a water supply intake on one side thereof and communicating with said flushing rim conduit on the other side thereof, at least a portion of the upper edge of said rim being at a lower level than said flow-over edge, said supply line having walls limiting the water supplied therefrom to said bowl to that flowing over said flow-over edge.

4. A water closet bowl having an outlet passage and a flushing rim providing a conduit communicating with the interior of the bowl, said bowl having a jet conduit associated with its outlet passage and a water supply line for said flushing rim and said jet conduit entering said bowl below the general level of said rim and including a flow-over edge and having a water supply intake on one side thereof and communicating with said flushing rim and jet conduit on the other side thereof, at least a portion of the periphery of said rim being at a lower level than said flow-over edge, said supply line having walls limiting the water supplied therefrom to said bowl to that flowing over said flow-over edge.

5. A water closet bowl having an outlet passage and a flushing rim providing a conduit communicating with the interior of the bowl, said bowl having a jet conduit associated with its outlet passage and a water supply line for said flushing rim and said jet conduit entering said bowl below the general level of said rim and including a reservoir providing a dam, and a water supply intake on one side thereof, said supply line including said reservoir communicating over said dam with the flushing rim and jet conduit and thereby and only thereby with the interior of the bowl, said flushing rim having at least a portion of its periphery at a lower level than said dam.

6. A water closet bowl having a rim, an outlet passage and a water supply pipe and containing a water supply conduit entering said bowl below the general level of said rim and communicating with said pipe and with the interior of the bowl, said supply conduit having at least one portion normally open to atmospheric pressure, the bottom of said portion being higher than at least a part of the top of said rim, the interior of said bowl communicating with its water supply pipe by way of at least one such portion and only by way of such a portion.

7. A water closet bowl having a rim, an outlet passage, a water supply inlet entering said bowl below the general level of said rim, and a reservoir communicating with said inlet and with the bowl interior, said reservoir being normally open to atmospheric pressure, and the walls of said reservoir normally maintaining a water level therein higher than the lowest level of the bowl rim.

FRANCIS T. MEYER.